UNITED STATES PATENT OFFICE.

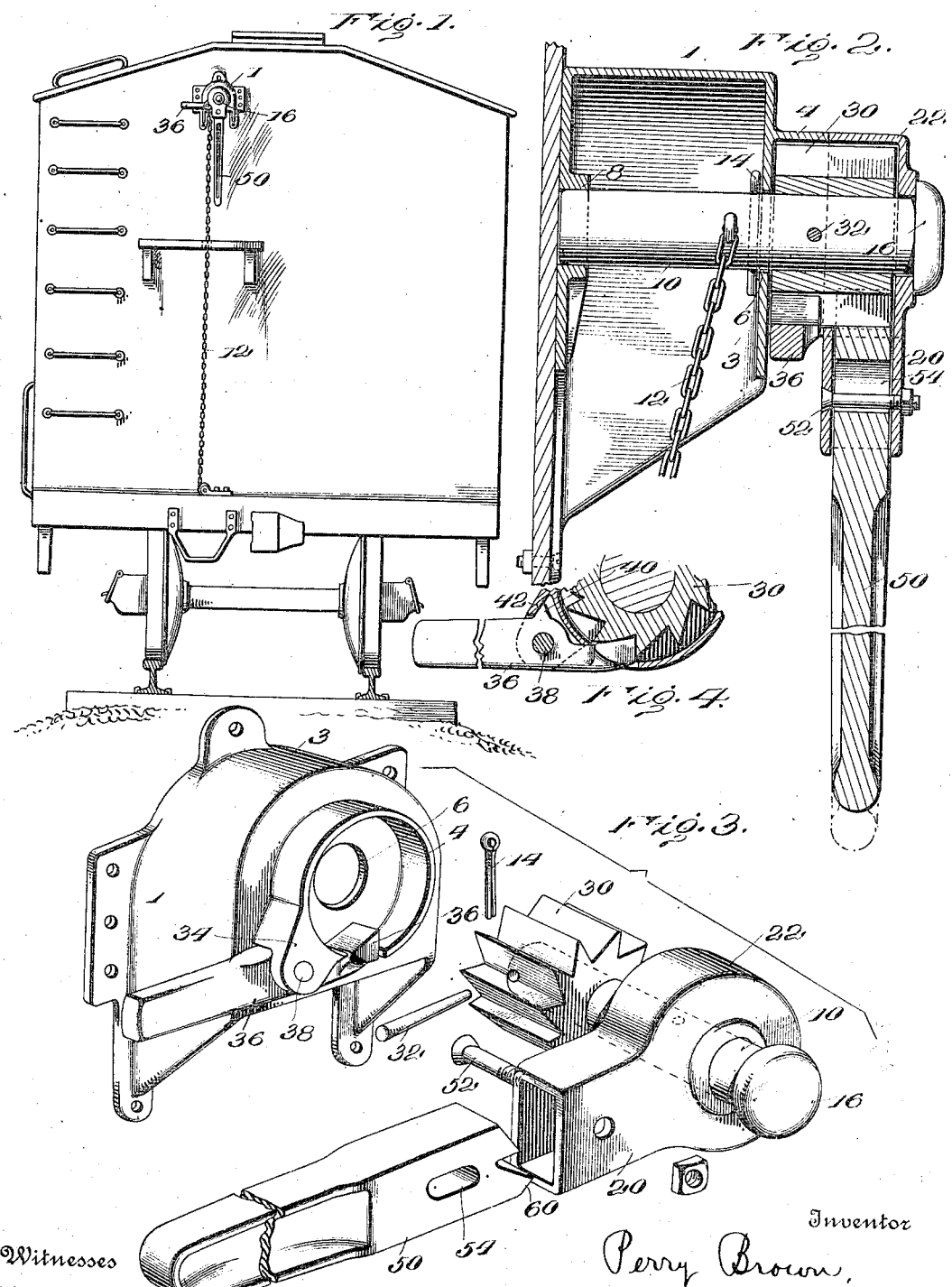

PERRY BROWN, OF CORAOPOLIS, PENNSYLVANIA.

CAR-BRAKE.

1,037,121. Specification of Letters Patent. Patented Aug. 27, 1912.

Application filed December 21, 1911. Serial No. 667,245. REISSUED

*To all whom it may concern:*

Be it known that I, PERRY BROWN, a citizen of the United States of America, and a resident of Coraopolis, in the county of Allegheny, State of Pennsylvania, and whose post-office address is 1507 Fifth avenue, Coraopolis, Pennsylvania, aforesaid, have made certain new and useful Improvements in Car-Brakes, of which the following is a specification.

This invention relates to brakes for railway cars and more particularly to hand operated brakes adapted to be secured to the ends of freight cars, although it may be used for other purposes, and the object of the invention is to construct a brake which will have very few parts, constructed with very little machine work, readily assembled into position and one in which the parts will hang by gravity in the position where they will occupy the least amount of room.

The invention consists in a brake of this character, such as shown, in its preferable embodiment, in the accompanying drawings, and as will be hereinafter described and claimed.

In the aforesaid drawings: Figure 1 is an end view of a car having my invention applied thereto. Fig. 2 is a vertical central section illustrating my invention on a much larger scale. Fig. 3 is a perspective view showing the various parts detached and separated in order to better show the construction. Fig. 4 is a detail-sectional view of the gravity pawl for holding the ratchet.

Referring now to the details of the drawings by numerals: 1 designates a frame, preferably a malleable casting, which is adapted to be secured to the end or any part of a car, as by riveting, in some such position as that shown in Fig. 1. This frame 1 is illustrated in sectional view in Fig. 2 and is shown detached in perspective view in Fig. 3 and as shown in these two figures, it will be seen that it comprises a hollow housing 3 and an annular ring 4 projecting from the housing 3. The frame 1 is provided with apertures 6 and 8 concentric with the annular ring 4 for the purpose of forming bearings for an axle 10 which forms a windlass for the brake chain 12, the axle 10 being secured within the frame 1 by means of a cotter 14 as illustrated in Fig. 2. The axle 10 is provided with a headed end 16 which projects at some distance beyond the ring 4 of the frame 1. Between the headed end 16 of the axle 10 and the ring 4 of the main frame 1 is supported a movable member 20 which has an annular part 22 which is substantially the same shape as the ring 4 and when in position forms a continuation of said ring, the annular ring 4 and the annular part 22 forming a pocket within which is housed a ratchet wheel 30 as illustrated in Figs. 2 and 3. This ratchet wheel 30 is keyed to the axle 10 by means of the pin 32 and the parts referred to are assembled as follows: The axle 12 is inserted through the opening in the member 20, then the ratchet wheel 30 is slipped over the axle 10 and the pin 32 driven through the ratchet wheel and the axle 10 so as to hold the two in fixed relation to each other. Then the member 20 with the axle 10 and ratchet wheel are placed in position with respect to the main frame 1, by inserting the axle 10 through the openings 6 and 8 until the annular member 22 joins the annular ring 4 and is coincident therewith, as illustrated in Fig. 2; and when the parts are in the position just described, the cotter 14 is driven through the axle 10, when the parts will be properly assembled.

The ratchet wheel 30 serves the double function of the two ratchet wheels commonly employed in this character of brake and it therefore coöperates with the parts now to be described. The annular ring 4 has formed on it a bearing 34 to which is pivoted a gravity pawl 36 by means of a countersunk pivot 38, the inner end of the pawl 36 projecting within an opening at the bottom of the annular ring 4 so as to be in the path of the teeth of the ratchet wheel 30 as illustrated in Fig. 4. From an inspection of Figs. 3 and 4, it will be seen that the longer end of the ratchet 36 will form a weight to normally hold the inner end 36 in contact with the teeth 30. In order to take part of the strain off of the pivot 38, I form the pawl with a lug 40 which, when the pawl is located between any two of the ratchet teeth, strikes against a wall 42 of the bearing 34 and thus relieves the pivot 38 of part of the strain. The member 20 hereinbefore referred to forms a socket to receive a handle or lever 50 which is held within the socket 20 by means of a bolt 52, as illustrated in Fig. 2. This bolt passes through a slot 54 in the inclosed end of the lever or handle 50 and the construction is such that when the handle is pushed within the socket in the position shown in full lines in Fig. 2, the end of the lever 50 which is formed with teeth 60 engages the teeth of the ratchet wheel 30 so that when the lever 50 is swung in one direction the ratchet wheel 30 and the axle 10 will be caused to rotate, thus winding the chain 12 on the inclosed part of the axle 10, the gravity pawl 36 moving and catching into the teeth in the usual manner to hold the ratchet wheel to the position to which it is moved. When the handle is released it will drop by gravity so as to fall into the position shown in dotted lines in Fig. 2, when, if the brake chain has not been wound sufficiently, the operator may repeat the movement just described. When it is desired to release the brake all the brakeman has to do is to move upward the free end of the gravity pawl 36 when the ratchet wheel 30 will be released as will be readily understood.

From the foregoing and accompanying drawings, it will be seen that I have invented a very simple form of hand-operated brake which is formed of few parts, constructed with very little machine work and which can be readily assembled and one in which the parts will hang by gravity in the position where they will occupy the least amount of space. It will also be seen that I have provided a brake wherein one ratchet wheel performs the same function now usually performed by two separate ratchet wheels and that the brake lever or handle which coöperates with this ratchet wheel is so constructed that it will always fall to the proper position.

It will furthermore be seen that I have formed a brake which provides a rain-proof housing for the axle forming the windlass and that this frame has an annular part with which co-acts a second annular part formed to move with the operating parts, these two annular parts forming a pocket or housing for the ratchet wheel, thus making a very compact construction.

What I claim as my invention is:

1. In a brake, a frame having a recessed member projecting therefrom, a second recessed member adjacent to the member projecting from the frame but movable with respect thereto, said recessed members forming a housing for a ratchet wheel, and a ratchet wheel located within said recessed members, said movable member having a handle or lever projecting therefrom adapted to coact with the ratchet wheel inclosed by said recessed members.

2. In a brake, a frame adapted to be secured to a part of a car and having a recessed member projecting therefrom, a second recessed member adjacent to the member projecting from the frame but movable with respect thereto, an axle passing through said recessed members, a ratchet wheel secured to said axle and located between said recessed members and a lever coöperating with the movable member and with said ratchet wheel adapted to rotate said movable member and the axle and ratchet wheel with respect to the frame and said first recessed member.

3. In a brake, a frame having a recessed member projecting therefrom, a second recessed member adjacent to the member projecting from the frame but movable with respect thereto, said recessed members forming a housing for a ratchet wheel, a ratchet wheel located within said recessed members, said movable member having a handle or lever projecting therefrom adapted to coact with the ratchet wheel inclosed by said recessed members, and a pawl pivotally supported with respect to said first recessed member and coacting with said ratchet wheel to hold the same.

4. In a brake, a frame having a recessed member projecting therefrom, a second recessed member adjacent to the member projecting from the frame but movable with respect thereto, said recessed members forming a housing for a ratchet wheel, a ratchet wheel located within said recessed members, said movable member having a handle or lever projecting therefrom adapted to coact with the ratchet wheel inclosed by said recessed members, and a gravity pawl pivotally supported with respect to said first recessed member and having a part coacting with the ratchet wheel to hold the same in position.

5. In a brake, a frame having a recessed member projecting therefrom, a second recessed member adjacent to the member projecting from the frame but movable with respect thereto, said movable recessed member having a socket, a ratchet wheel located within said recessed members, and a handle located within the socket of said movable member and having its end adapted to engage the teeth of said ratchet wheel.

6. In a brake, a frame having a recessed member projecting therefrom, a second recessed member adjacent to the member projecting from the frame but movable with respect thereto, said movable recessed member having a socket, a ratchet wheel located within said recessed members, and a handle located within the socket of said movable member, and a pawl pivotally supported with respect to said first recessed member and coacting with said ratchet wheel to hold the same.

7. In a brake, a frame having a recessed member projecting therefrom, a second recessed member adjacent to the member projecting from the frame but movable with respect thereto, said movable recessed member having a socket, a ratchet wheel located within said recessed members, and a handle located within the socket of said movable member and having its end adapted to engage the teeth of said ratchet wheel, one of said members having a slot therein and a pin passing through said members and through said slot, whereby the handle has a sliding movement with respect to said socket.

8. In a brake, a frame having a recessed member projecting therefrom, a second recessed member adjacent to the member projecting from the frame but movable with respect thereto, a ratchet wheel located within said recessed members, a pawl projecting through the fixed member and coacting with said ratchet wheel to hold the same, and a handle or lever projecting from the movable member and having its end coacting with the ratchet wheel to turn the same as said handle and movable member are turned.

9. In a brake, a frame adapted to be secured to a part of a car and having an annular recessed member projecting therefrom but in fixed relation thereto, a second annular member located adjacent to the first annular member and the two annular members forming a pocket to receive a ratchet wheel, an axle passing through the two annular members and securing the same together, a ratchet wheel secured to said axle and located within said annular members, and a handle or lever supported by said movable annular member and adapted to engage the teeth of said ratchet wheel whereby when said handle and said movable annular member are rotated with respect to said fixed annular member the ratchet wheel and axle are rotated.

10. In a brake, a frame adapted to be secured to a part of a car and having an annular recessed member projecting therefrom but in fixed relation thereto, a second annular member located adjacent to the first annular member and the two annular members forming a pocket to receive a ratchet wheel, an axle passing through the two annular members and securing the same together, a ratchet wheel secured to said axle and located within said annular members, a pawl pivotally supported with respect to the fixed annular member and coacting with the ratchet wheel therein, and a handle or lever supported by said movable annular member and adapted to engage the teeth of said ratchet wheel whereby when said handle and said movable annular member are rotated with respect to said fixed annular member the ratchet wheel and axle are rotated.

11. In a brake, a frame adapted to be secured to a part of a car and having a box-like portion provided with a hood on the same, and having a recessed member projecting from said frame, a second recessed member movably supported with respect to the first recessed member, said recessed members forming a housing for a ratchet wheel, an axle passing through both of said recessed members and through the frame, part of said axle being within the box-like portion of the frame and under said hood and adapted to have the brake chain secured thereto, a ratchet wheel secured to said axle and located within the housing formed by said recessed members, and a handle movable with respect to said movable annular member and adapted to coact with said ratchet wheel, whereby when the handle and the movable recessed portions are moved the end of the handle engages the ratchet wheel to rotate said ratchet wheel and its axle.

12. In a brake, a frame adapted to be secured to a part of a car and having a box-like portion provided with a hood on the same, and having a recessed member projecting from said frame, a second recessed member movably supported with respect to the first recessed member, said recessed members forming a housing for a ratchet wheel, an axle passing through both of said recessed members and through the frame, part of said axle being within the box-like portion of the frame and under said hood and adapted to have the brake chain secured thereto, a ratchet wheel secured to said axle and located within the housing formed by said recessed members, and a pawl pivotally supported with respect to said fixed recessed member and having its end projecting into the path of the ratchet wheel therein, and a handle movable with respect to said movable recessed member and adapted to co-act with said ratchet wheel, whereby when the handle and the movable recessed members are moved the end of the handle engages the ratchet wheel to rotate said ratchet wheel and its axle.

13. In a brake, a frame adapted to be secured to part of a car and having a box-like portion provided with a hood on the same, and having a recessed member projecting from said box-like portion, a second recessed member movably supported with respect to said first recessed member, a ratchet wheel located within said recessed members, an axle to which said ratchet wheel is secured, said axle passing into said box-like portion under said hood, and a lever or handle movable with the movable recessed member and adapted to engage said ratchet wheel to move the same when the handle and the movable member are rotated.

14. In a brake, a frame adapted to be secured to part of a car and having a box-like portion provided with a hood over the box-like portion and a recessed member projecting from the box-like portion, a second recessed member movable with respect to the first recessed member, an axle securing said members together and passing into the box-like portion under said hood, a ratchet wheel secured to said axle within the recessed members, and a handle or lever movable with the second recessed member and adapted to co-act with the ratchet wheel to move the same and its axle.

In testimony whereof I affix my signature in presence of two witnesses.

PERRY BROWN.

Witnesses:
H. L. IMIRIE,
JOHN L. FLETCHER.